(12) United States Patent
Bainbridge et al.

(10) Patent No.: US 8,159,904 B2
(45) Date of Patent: Apr. 17, 2012

(54) FORCE-FEEDBACK SEISMOMETER

(75) Inventors: Geoffrey Bainbridge, Ottawa (CA);
Nicholas Jason Ackerley, Kanata (CA)

(73) Assignee: Nanometrics Inc., Kanata, Ontario (CA)

( * ) Notice: Subject to any disclaimer, the term of this patent is extended or adjusted under 35 U.S.C. 154(b) by 318 days.

(21) Appl. No.: 12/709,443

(22) Filed: Feb. 19, 2010

(65) Prior Publication Data
US 2010/0226211 A1 Sep. 9, 2010

(30) Foreign Application Priority Data
Mar. 6, 2009 (CA) .................................... 2658143

(51) Int. Cl.
*G01V 1/18* (2006.01)
(52) U.S. Cl. ...................................... 367/178
(58) Field of Classification Search .................. 367/178; 73/514.32, 514.38
See application file for complete search history.

(56) References Cited

U.S. PATENT DOCUMENTS

| 6,075,754 | A | 6/2000 | VanZandt et al. | |
| 2003/0140699 | A1* | 7/2003 | Pike et al. | 73/514.32 |
| 2007/0028689 | A1 | 2/2007 | Vrcelj | |
| 2010/0226211 | A1* | 9/2010 | Bainbridge et al. | 367/178 |

FOREIGN PATENT DOCUMENTS

| GB | 2423153 A | 8/2006 |
| GB | 2468408 A * | 9/2010 |

OTHER PUBLICATIONS

Search Report, Application No. GB1003621.8, Jun. 29, 2010.

* cited by examiner

*Primary Examiner* — Daniel Pihulic
(74) *Attorney, Agent, or Firm* — Gardere Wynne Sewell LLP; Andre M. Szuwalski (57) ABSTRACT

A broadband weak-motion seismometer includes: a frame, a mass, a suspension means for movably connecting the mass to the frame, a sensing transducer for measuring displacement of the mass with respect to the frame and for generating a sensing transducer output signal, which is a function of the measured displacement, a forcing transducer for applying a feedback force in a predetermined direction to the mass, and a control circuit. The control circuit receives the sensing transducer output signal and generates a forcing transducer input signal that includes a self-noise component. The forcing transducer input signal is processed by the forcing transducer to apply the feedback force to maintain the mass at rest with respect to the frame. The feedback force is sufficient to counterbalance a constant acceleration of the frame of at least 0.2 $m/s^2$ in the predetermined direction of the feedback force. The self-noise component of the forcing transducer input signal, when processed by the forcing transducer, produces variable acceleration of the mass with spectral density less than −150 dB with respect to 1 $m^2/s^3$ at 0.01 Hz.

13 Claims, 3 Drawing Sheets

FORCE-FEEDBACK SEISMOMETER

PRIORITY CLAIM

The present application claims priority from Canadian Application for Patent No. 2,658,143 filed Mar. 6, 2009, the disclosure of which is hereby incorporated by reference.

TECHNICAL FIELD

The present invention relates to the field of seismometers and more particularly to systems and methods for force-feedback control in seismometers.

BACKGROUND

There exist two general classes of seismometers known as short-period and broadband seismometers. Broadband seismometers can measure weak ground motion at low frequencies, whereas short-period seismometers cannot. The amplitude of seismic ground motion tends to drop rapidly with a frequency below 1 Hz, while the self-noise level of seismometers tends to rise, so that it is much easier to achieve a good signal-to-noise ratio at frequencies above 1 Hz ("short periods") than at lower frequencies.

Most broadband and some short-period seismometers are of the force-feedback type. All force-feedback seismometers comprise an electronic means for applying a force to hold a movable inertial mass at a predetermined null position with respect to a frame resting on the ground. In short-period seismometers with electronic force feedback, the feedback is strong enough to balance effects of tilt and temperature on the seismometer mechanics as well as inertial forces due to seismic ground motion; however this strong electronic feedback causes noise that makes the seismometer unable to measure weak ground motion at low frequencies. In broadband seismometers the electronic force feedback is made weaker (by design) to improve noise performance, but an additional mass centering adjustment mechanism is required for adjusting the internal mechanics of the seismometer to balance the effects of tilt and temperature. This mass centering adjustment mechanism adds to the size and cost of the seismometer and impairs reliability. Furthermore it is inconvenient to adjust the internal mechanics each time the seismometer is installed at a new site and to re-adjust from time to time as the tilt or temperature of the installation changes.

Therefore there is a need for a broadband force-feedback seismometer that can accommodate a useful operating range of tilt and temperature in field service without adjustment of the internal mechanics. Also any design improvement that can reduce the size and cost of a broadband seismometer is desirable.

SUMMARY

Certain exemplary embodiments can provide a broadband weak-motion seismometer comprising: a frame, a mass, a suspension means for movably connecting the mass to the frame, a sensing transducer for measuring displacement of the mass with respect to the frame and for generating a sensing transducer output signal, which is a function of said displacement, a forcing transducer for applying a feedback force in a predetermined direction to the mass, and a control circuit for receiving the sensing transducer output signal and for generating a forcing transducer input signal that includes a self-noise component; the forcing transducer input signal being processed by the forcing transducer to apply the feedback force so as to maintain the mass at rest with respect to the frame; the feedback force being sufficient to counterbalance a constant acceleration of the frame of at least 0.2 m/s² in the predetermined direction of the feedback force, wherein the self-noise component of the forcing transducer input signal, when processed by the forcing transducer, produces variable acceleration of the mass with spectral density less than −150 dB with respect to 1 m²/s³ at 0.01 Hz.

Certain exemplary embodiments can provide a force feedback method for use in a broadband weak-motion seismometer having: a frame; a mass; a suspension means for movably connecting the mass to the frame; a mass capacitor plate operatively connected to the mass; a frame capacitor plate operatively connected to the frame and oriented parallel to the mass capacitor plate and spaced apart from the mass capacitor plate by a perpendicular distance; the method comprising: sensing displacement of the mass with respect to the frame by measuring the perpendicular distance between the mass capacitor plate and the frame capacitor plate and producing a sensing transducer output signal based on the measured perpendicular distance; generating a forcing transducer input signal from the sensing transducer output signal; generating a feedback force from the forcing transducer input signal, the feedback force including a self-noise component; applying the feedback force in a predetermined direction to the mass so as to maintain the mass at rest with respect to the frame; the feedback force being sufficient to counterbalance a constant acceleration of the frame of at least 0.2 m/s² in the predetermined direction, and wherein the self-noise component of the feedback force produces variable acceleration of the mass with spectral density less than −150 dB with respect to 1 m²/s³ at 0.01 Hz.

DETAILED DESCRIPTION OF THE DRAWINGS

Figure 1A:
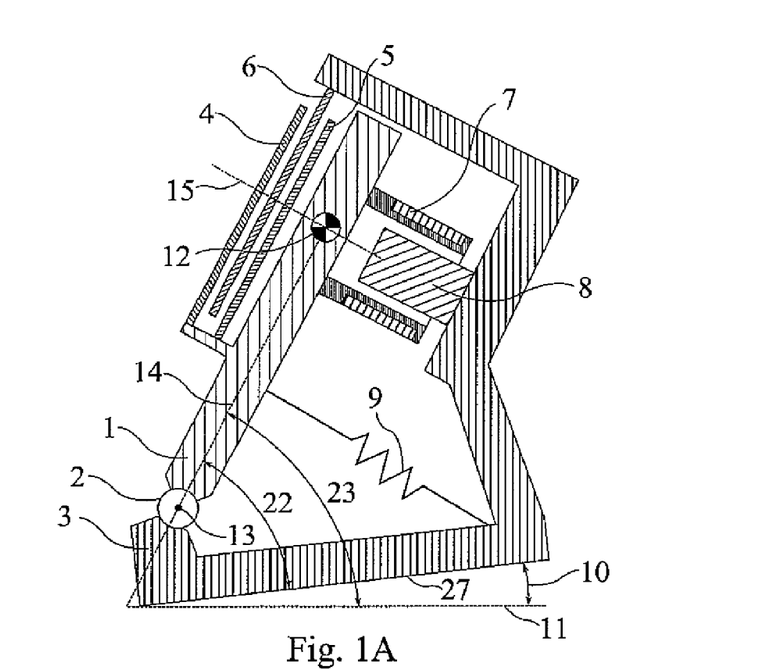
FIGS. 1A and 1B illustrate schematic representations of components of a force-feedback seismometer according to an embodiment.
Figure 1B:
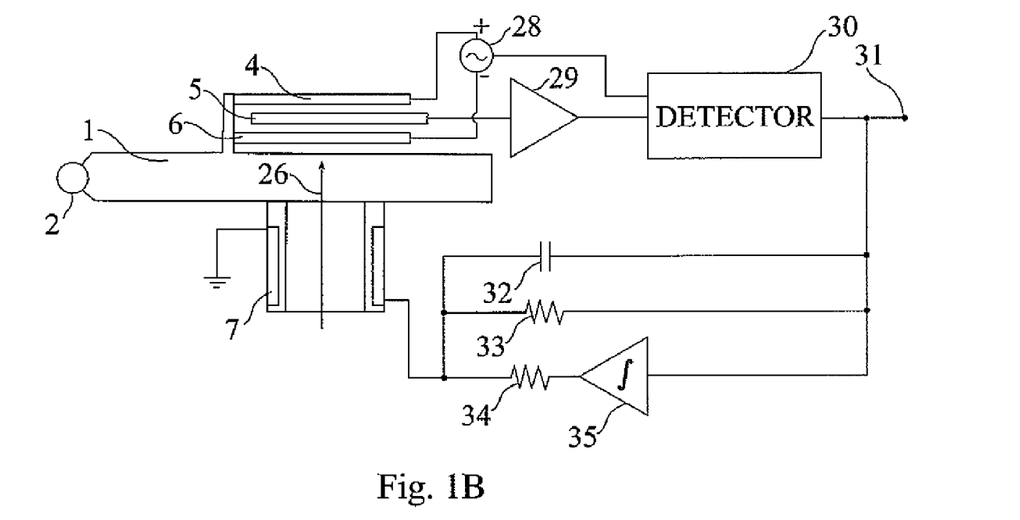

One embodiment of a broadband weak-motion seismometer with force feedback control is schematically represented in FIGS. 1A and 1B. FIG. 1A is a simplified schematic diagram showing mechanical components. FIG. 1B is a simplified schematic diagram showing electrical components. FIGS. 1A and 1B together show an assembly for sensing ground motion in one direction of sensitivity 15. This directional sensing assembly is known as a seismometer axis. In order to measure motion in all directions, force-feedback seismometers often comprise three separate axes, oriented perpendicular to each other.

Referring to FIG. 1A, a boom 1 is connected by a suspension means to a frame 3. The suspension means includes a pivot 2 and a spring 9. The pivot 2 allows the boom 1 to rotate substantially freely through a prescribed range of motion around a pivot axis 13 with a single degree of freedom. The spring 9 applies a force, which is determined and set at time of assembly, to balance the force of gravity and support the boom 1 at a prescribed boom angle 22 with respect to the frame 3 when the frame 3 is level.

In the general case where the frame 3 may be tilted, the boom angle 23 is defined as follows. The boom 1, components that are fixed to the boom 1 and components that move with the boom 1 together comprise a movable boom assembly. The movable boom assembly has a center of mass 12. The plane passing through the center of mass 12 and the pivot axis 13 is known as the plane of the boom 14. The boom angle 23 is the angle between the plane of the boom 14 and a true horizontal plane 11 perpendicular to the direction of gravity. The frame 3 comprises a horizontal reference surface 27. When the frame horizontal 27 is parallel to true horizontal 11, then the seismometer is considered to be level. The seismometer should be used in a level orientation, but in field service the frame 3 may be oriented at a tilt angle 10, which will cause the boom angle 23 to vary from the prescribed boom angle 22.

Motion of the frame 3 perpendicular to the plane of the boom 14 will cause the boom 1 to rotate around the pivot 2 and will cause the center of mass 12 to move with respect to the frame 3. However, motion of the frame 3 in the plane of the boom 14 will not cause the boom 1 to rotate nor cause the center of mass 12 to move with respect to the frame 3. Therefore, the direction of sensitivity 15 of the seismometer axis is the direction perpendicular to the plane of the boom 14.

A sensing transducer senses the position of the boom 1 with respect to the frame 3 as follows. The sensing transducer includes a top plate 4 and a bottom plate 5 fixed to the boom 1, and an inner plate 6 fixed to the frame 3. An example electronic feedback control circuit is shown in FIG. 1B. The electronic feedback control circuit includes an oscillator 28, which applies oscillating voltages with equal amplitude and frequency but opposite phase to the top plate 4 and bottom plate 5. These oscillating voltages are capacitively coupled to the center plate 6.

The three plates 4, 5, 6 of the sensing transducer are substantially parallel and are oriented so that rotation of the boom 1 around the pivot 2 causes the top plate 4 and bottom plate 5 to move in a direction substantially perpendicular to the plane of the center plate 6, thereby changing the distances between the center plate 6 and the other two plates 4, 5. The null position of the boom 1 is the position in which the top plate 4 and the bottom plate 5 are at equal distances from the center plate 6, so that the capacitances between the plates are equal and therefore the opposite voltages applied to the top plate 4 and the bottom plate 5 cancel to produce zero voltage on the center plate 6.

If the boom 1 moves away from the null position a non-zero signal appears on the center plate 6 and this signal is amplified by a front-end amplifier 29 and interpreted by a detector circuit 30. The detector circuit 30 generates a seismometer output voltage 31, which is a function of ground motion. The seismometer output voltage 31 is fed back to control the motion of the boom via a feedback network with three branches, one branch includes a differential feedback capacitor 32, a second branch includes a proportional feedback resistor 33, and a third branch known as an integrator includes an integrating amplifier 35 and an integrator output resistor 34.

The output currents from each of the three branches of the feedback network combine to produce a feedback current that is input to a forcing transducer. The forcing transducer includes a coil 7 fixed to the boom 1 and a magnet 8 fixed to the frame 3. The feedback current passing through the coil 7 produces a feedback force 26 that acts to oppose any motion of the boom 1 away from the null position and thereby keep the boom at rest with respect to the frame 3.

When the loop gain is high, the sensitivity of the seismometer output voltage 31 to a ground motion input at any given frequency is determined by the gain of the feedback network at that frequency. The integrator has a very high gain at DC so that the seismometer output voltage 31 is substantially insensitive to a constant acceleration or tilt of the frame 3, or equivalently, a constant force applied to the boom 1. The integrator compensates any imbalance between the suspension force 19 and the force of gravity 16 as shown in FIG. 3B, thereby maintaining the boom 1 at the prescribed boom angle 22 with respect to the frame and the sensing transducer in a prescribed operating range centered on the null position. The gain of the integrator declines with frequency so that the sensitivity of the seismometer output voltage 31 to time-varying seismic ground motion is set by the differential feedback capacitor 32 and proportional feedback resistor 33.

Figure 2A:
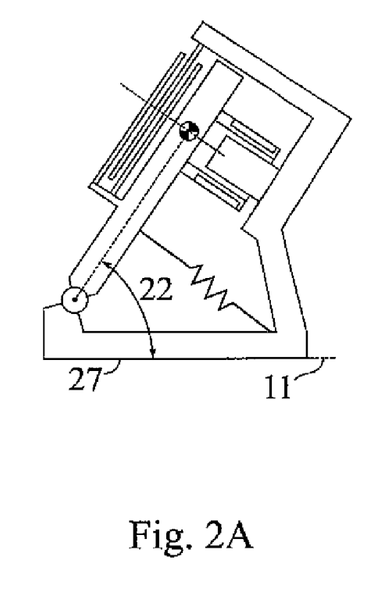
FIGS. 2A and 2B are schematic representations to illustrate the balance of forces as set at time of assembly of the seismometer of FIGS. 1A and 1B.
Figure 2B:
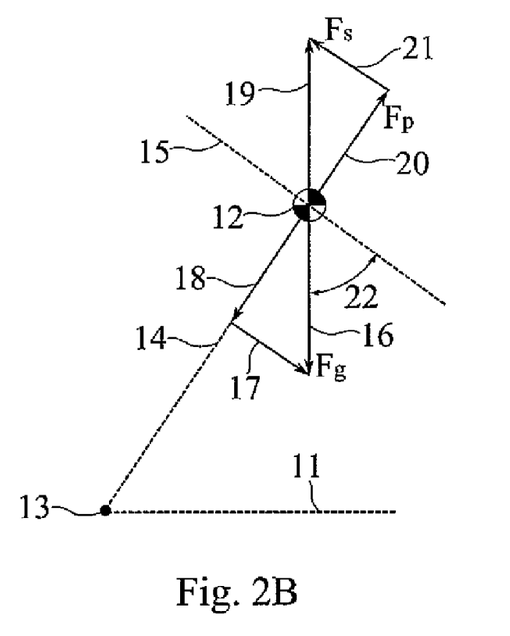

FIGS. 2A and 2B show the balance of forces as set at time of assembly when the frame 3 is level. The force of gravity 16 acting straight downwards is balanced by a suspension force 19 acting straight upwards. The force of gravity 16 has an on-axis component 17 acting in the direction of sensitivity 15 that is balanced by a spring force 21, and an off-axis component 18 acting in the plane of the boom 14 that is balanced by a pivot force 18.

Figure 3A:
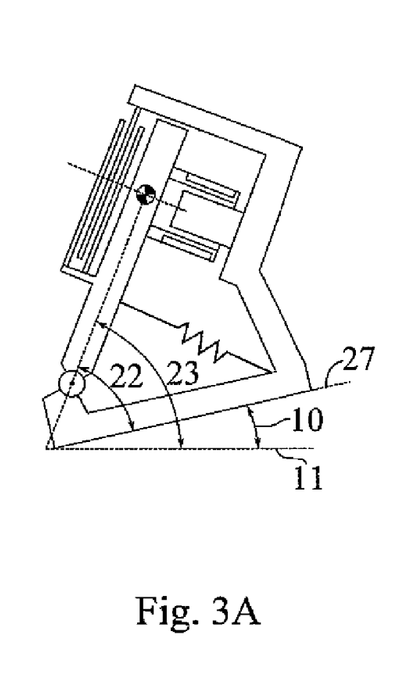
FIGS. 3A and 3B are schematic representations to illustrate the balance of forces when the frame of the seismometer of FIGS. 1A and 1B is oriented at a tilt angle.
Figure 3B:
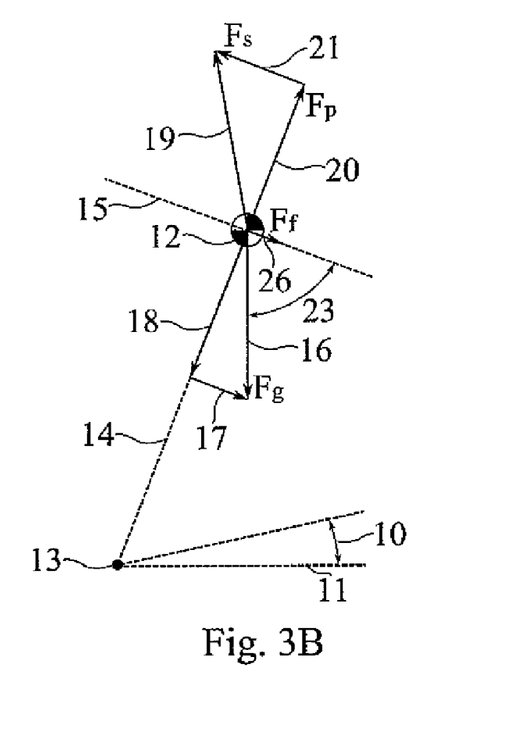

FIGS. 3A and 3B shows the balance of forces when the frame 3 is oriented at a tilt angle 10. The force of gravity 16 and the spring force 21 have not changed. However, since the boom angle 23 has changed, the on-axis component of gravity 17 has changed so that it no longer balances the spring force 21 and a feedback force 26 is supplied by the integrator to hold the boom at rest with respect to the frame. The off-axis component of gravity 18 has also changed and the pivot force 18 has changed to balance it; this causes only a negligible amount of off-axis motion, since motion in the plane of the boom 14 is stiffly constrained by the pivot 2. The feedback force 26 is the force acting on the center of mass 12 due to the forcing transducer, which may not be attached at the center of mass 12 but that applies a torque to the boom and therefore applies a resultant feedback force 26 to the center of mass 12.

Similarly, if the frame 3 is level but the spring force 21 changes due to variation in stiffness with temperature, then again a feedback force 26 is be supplied by the integrator to hold the boom 1 at rest with respect to the frame 3.

Furthermore, when the frame 3 accelerates due to seismic ground motion, an inertial force acts on the boom 1, and the inertial force is also be balanced by the feedback force 26 and pivot force 18. The total balance of forces is described by Equation 1.

$$\vec{a} = \frac{\vec{F}}{m} = \vec{g} + \frac{\vec{F_s}}{m} + \frac{\vec{F_f}}{m}, \quad \text{Equation 1}$$

where $\vec{a}$ is the acceleration of the frame 3 due to ground motion, $\vec{F}$ is the total force required to hold the boom 1 at a constant position with respect to the frame, m is the mass of the boom 1, $\vec{g}$ is the gravitational acceleration, $\vec{F_s}$ is the suspension force 19, and $\vec{F_f}$ is the feedback force 26.

Equation 1 can be rewritten as scalar Equation 2 describing the balance of forces in the direction of sensitivity.

$$a = \frac{F}{m} = g\cos\varphi + \frac{F_s}{m} + \frac{F_f}{m}, \quad \text{Equation 2}$$

where g is the magnitude of gravitational acceleration, $\phi$ is the boom angle 23, and the other forces and accelerations are the components of the forces and accelerations in Equation 1 in the direction of sensitivity 15.

Therefore, the feedback force $F_f$ 26 has components—mg cos $\phi$—$F_s$ 17, 21, which remain substantially constant for hours or days at a time, and a more rapidly time-varying component ma which is a proportional measure of seismic ground motion. The integrator cancels the constant components of force mg cos $\phi$+$F_s$ 17,21, so that only the time-varying seismic signal appears in the seismometer output 31. The magnitudes of these constant components of force are as follows:

1. The boom angle $\phi$ 23 varies according to the orientation of the seismometer. In field use conditions it may be significantly non-level, since precise leveling requires effort, and may not be possible in some situations. A typical installation using a bubble level will set the seismometer within 0.1 degree of level, and so $\phi$ 23 will be within 0.1 degree of a prescribed value 22. However, the seismometer may become tilted over time by 1 degree or more due to settling or frost heaving of the soil. Furthermore, when the seismometer is deployed in a location that is not accessible by a human, for example in a borehole or on the ocean bottom, then it will likely be tilted by at least 1 degree. The effect of tilt 10 (change in $\phi$ 23) depends on the initial value of $\phi$ 23. A horizontal axis is most sensitive to tilt, since for $\phi \cong 90°$, cos $\phi \cong \phi$ 23, and a 1 degree tilt will cause a 1.7% change in the gravitational force mg cos $\phi$ 17. A vertically oriented axis is least sensitive to tilt, since for $\phi \cong 0$, cos $\phi$ 1−$\phi^2$/2, and a 1 degree tilt will cause only a 0.015% change in the gravitational force mg cos $\phi$ 17. An inclined axis in a symmetric triaxial seismometer typically has $\phi \cong 55°$ and therefore has an intermediate sensitivity to tilt.
2. The suspension force $F_s$ 21 varies over time due to temperature sensitivity of the spring 9. Seismometers are exposed to outdoor temperatures in all climates. Variation in $F_s$ 21 over a ±50 degree Celsius operating temperature range is approximately ±2% for ordinary spring materials.
3. The gravitational acceleration g varies with latitude and altitude. It is approximately 0.5% greater at sea level at the North Pole than in high equatorial regions, therefore varying by ±0.25% with respect to gravity at mid-latitudes.

In order to accommodate a useful operating range of tilt and temperature in field service without adjustment of the internal mechanics, the output of the integrator, applied to a coil 9 (i.e. a forcing transducer), is be able to produce a constant force of at least ±2% of mg (equivalent to ±0.2 m/s$^2$ acceleration or about ±1 degree tilt of a horizontal axis).

The maximum acceleration that can be balanced by the force feedback 26 is given by:

$$a_{max} = k_M I_{max} = \frac{k_F}{m} \cdot \frac{V_{max}}{R}, \quad \text{Equation 3}$$

where $V_{max}$ is the maximum output voltage of the integrating amplifier 35, R is the integrator output resistance 34, $$I_{max} = \frac{V_{max}}{R}$$

is the maximum output current of the integrator, $k_F$ is the sensitivity of the forcing transducer in newtons applied to the center of mass 12 per ampere of current in the coil 7, and $$k_M = \frac{k_F}{m}$$

is the combined acceleration of the center of mass 12 per ampere of the current in the coil 7.

The integrating amplifier 35 inevitably has a certain level of output voltage noise. This noise voltage produces noise acceleration according to Equation 4.

$$a_n = k_M I_n = \frac{k_F}{m} \cdot \frac{V_n}{R}, \quad \text{Equation 4}$$

where $V_n$ is the output voltage noise of the integrator, $a_n$ is the noise acceleration due to the integrator, and the other variables are as in Equation 3.

Since $V_n$ varies with frequency, it is best expressed as a voltage spectral density function of frequency, so that $a_n$ is an acceleration spectral density function of frequency.

A force-feedback seismometer with broadband low-noise performance should have a sufficiently low value of $a_n$, and to make a force-feedback seismometer without mechanical mass centering requires a sufficiently large value of $a_{max}$. Two factors should be considered:

1. An integrator with sufficiently large dynamic range $$\frac{V_{max}}{V_n},$$

and

2. An appropriate feedback acceleration sensitivity $$\frac{k_F}{mR}.$$

If the dynamic range $V_{max}/V_n$ of the integrator is sufficiently high, then there exists a range of values for $k_F/mR$ which simultaneously achieves a high enough $a_{max}$ to accommodate a useful operating range of tilt and temperature in field service, and also a low enough $a_n$ to allow broadband low-noise performance.

In an embodiment, the following parameter values are used:

$$V_{max} = 40 \text{ V},$$

$$V_n = 0.9 \frac{\mu V}{\sqrt{Hz}} \text{ at } 0.01 \text{ Hz},$$

$$k_F = 19 \frac{N}{A},$$

$$m = 14 \text{ grams, and}$$
$$R = 150 \text{ k}\Omega.$$

These parameter values are typical of broadband low-noise seismometers, with the exception of the mass m. A 14 gram inertial mass is typical of short-period seismometers, whereas broadband low-noise seismometers typically use a mass about 10 times larger.

Reducing the mass is one way to increase $$\frac{k_F}{mR}$$

and thereby increase $a_{max}$. Reducing the mass helps to reduce the overall size of the seismometer and thereby also reduce the cost. Reducing the mass also has the advantage of reducing the power output of the integrator and thereby reducing the total power consumption of the seismometer, as follows.

$$P_{max} = V_{max} \cdot I_{max} = V_{max} \cdot a_{max} \cdot \frac{m}{k_F} \qquad \text{Equation 5}$$

Therefore a reduction in mass results in a proportional reduction of power required for a given value of $a_{max}$.

The new combination of parameter values listed above gives the result that:

$$a_{max} = 0.36 \frac{\text{m}}{\text{s}^2} = 3.7\% \text{ of g,}$$

which is large enough to accommodate a useful operating range of tilt and temperature in field service, and $$a_n = 8.1 \times 10^{-9} \frac{\text{m/s}^2}{\sqrt{\text{Hz}}} = -162 \text{ dB} \frac{\text{m}^2}{\text{s}^3} \text{ at 0.01 Hz,}$$

which is low enough for most teleseismic and background seismic studies where a low-noise broadband seismometer would be required. The output noise voltage $V_n$ of the integrating amplifier 35 has a power spectrum with 1/f slope at low frequencies; therefore $a_n$ declines with frequency at a rate of 10 dB per decade above 0.01 Hz.

Figure 4:
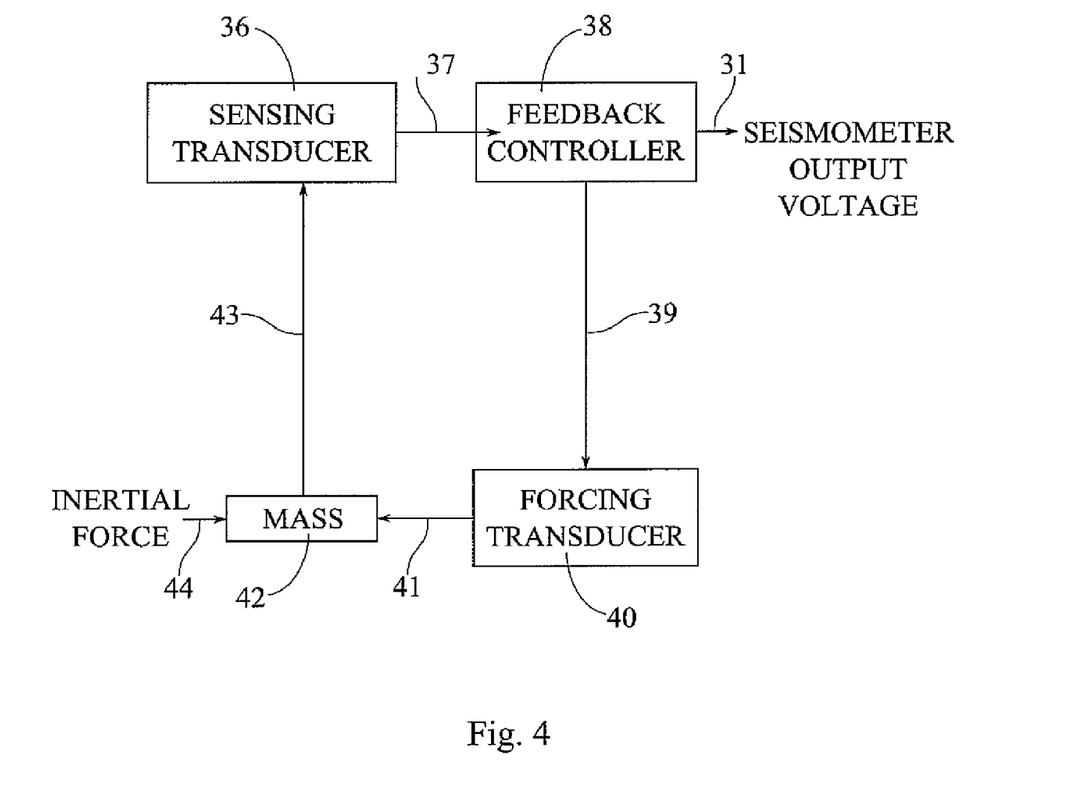
FIG. 4 is a schematic signal flow representation of a method of force-feedback control of a seismometer according to an embodiment.

FIG. 4 shows a force feedback method for use in a broadband weak-motion seismometer having the structures and parameter values previously described.

A sensing transducer 36 senses displacement 43 of the mass 42 (i.e., the pivotable boom assembly previously described) with respect to the frame as follows. Oscillating voltages from an oscillator 28 are applied to the top plate 4 and bottom plate 5 and capacitively coupled to the center plate 6. The resultant voltage on the center plate 6 is the sensing transducer output signal 37; its amplitude is a measure of the distance of the boom 1 from the null position and its phase is a measure of the direction of displacement of the boom 1, either positive or negative with respect to the null position.

A feedback controller 38 generates a forcing transducer input signal 39 from the sensing transducer output signal 37 as follows. The sensing transducer output signal 37 is processed by the detector 30 to produce the seismometer output voltage 31. The seismometer output voltage 31 is input to the feedback network having three branches as previously described. The output currents from each of the three branches of the feedback network combine to produce a forcing transducer input signal 39.

A forcing transducer 40 generates a feedback force 41 from the forcing transducer input signal 39 as follows. The forcing transducer input signal 39 is applied to a coil 7 fixed to the boom 1. The resultant current in the coil 7 passing through the field of a magnet 8 fixed to the frame 3 produces a force on the coil 7. The force on the coil 7 is transferred to the boom 1 to produce a torque which in turn produces the feedback force 41 acting on the center of mass 12.

The feedback force 41 acting on the mass 42 accelerates it according to Newton's Second Law. Acceleration of the frame 3 produces an inertial force 44, which also acts on the mass 42. The displacement 43 of the mass with respect to the frame is the result of the net acceleration produced by all forces acting on the mass. The feedback controller 38 generates the forcing transducer input signal 39 to balance the forces acting on the mass 42 as previously described and therefore minimize the displacement 43, maintaining the mass 42 at rest with respect to the frame 3.

The feedback controller 38 has a finite dynamic range that dictates a maximum limit on the magnitude of the forcing transducer input signal 39 and also dictates a minimum limit on the spectral density of the time-varying self-noise component of the forcing transducer input signal 39. These limits on the forcing transducer input signal 39 impose limits on the feedback force 41 and the resultant maximum acceleration $a_{max}$ and noise acceleration $a_n$ as previously described.

The combination of parameter values previously described produce $$a_{max} = 0.36 \frac{\text{m}}{\text{s}^2},$$

which is large enough to accommodate a useful operating range of tilt and temperature in field service, and $$a_n = -162 \text{ dB} \frac{\text{m}^2}{\text{s}^3}$$

at 0.01 Hz, which is low enough for most teleseismic and background seismic studies where a low-noise broadband seismometer is used.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proper by way of example to facilitate comprehension of the invention and should not be construed to limit the scope thereof.

What is claimed is:

1. A broadband weak-motion seismometer comprising:
   a frame,
   a mass,
   a suspension means for movably connecting the mass to the frame, a sensing transducer for measuring displacement of the mass with respect to the frame and for generating a sensing transducer output signal, which is a function of said displacement, a forcing transducer for applying a feedback force in a predetermined direction to the mass, and a control circuit for receiving the sensing transducer output signal and for generating a forcing transducer input signal that includes a self-noise component; the forcing transducer input signal being processed by the forcing transducer to apply the feedback force so as to maintain the mass at rest with respect to the frame; the feedback force being sufficient to counterbalance a constant acceleration of the frame of at least 0.2 m/s$^2$ in the predetermined direction of the feedback force, wherein the self-noise component of the forcing transducer input signal, when processed by the forcing transducer, produces variable acceleration of the mass with spectral density less than −150 dB with respect to 1 m$^2$/s$^3$ at 0.01 Hz.

2. A seismometer as in claim 1, wherein the sensing transducer comprises a mass capacitor plate operatively connected to the mass; and a frame capacitor plate operatively connected to the frame and oriented parallel to the mass capacitor plate and spaced apart from the mass capacitor plate by a perpendicular distance; and wherein the sensing transducer measures the perpendicular distance between the mass capacitor plate and the frame capacitor plate and produces the sensing transducer output signal based on the measured perpendicular distance.

3. A seismometer as in claim 1, wherein the self-noise component of the forcing transducer input signal, when processed by the forcing transducer, produces variable acceleration of the mass with spectral density less than −160 dB with respect to 1 m$^2$/s$^3$ at 0.01 Hz.

4. A seismometer as in claim 2, wherein the self-noise component of the forcing transducer input signal, when processed by the forcing transducer, produces variable acceleration of the mass with spectral density less than −160 dB with respect to 1 m$^2$/s$^3$ at 0.01 Hz.

5. A seismometer as in claim 1, wherein the mass is less than 50 grams.

6. A force feedback method for use in a broadband weak-motion seismometer having: a frame; a mass; a suspension means for movably connecting the mass to the frame; a mass capacitor plate operatively connected to the mass; a frame capacitor plate operatively connected to the frame and oriented parallel to the mass capacitor plate and spaced apart from the mass capacitor plate by a perpendicular distance; the method comprising:

sensing displacement of the mass with respect to the frame by measuring the perpendicular distance between the mass capacitor plate and the frame capacitor plate and producing a sensing transducer output signal based on the measured perpendicular distance;

generating a forcing transducer input signal from the sensing transducer output signal;

generating a feedback force from the forcing transducer input signal, the feedback force including a self-noise component;

applying the feedback force in a predetermined direction to the mass so as to maintain the mass at rest with respect to the frame; the feedback force being sufficient to counterbalance a constant acceleration of the frame of at least 0.2 m/s$^2$ in the predetermined direction, and wherein the self-noise component of the feedback force produces variable acceleration of the mass with spectral density less than −150 dB with respect to 1 m$^2$/s$^3$ at 0.01 Hz.

7. A force feedback method as in claim 6, wherein the self-noise component of the feedback force produces variable acceleration of the mass with spectral density less than −160 dB with respect to 1 m$^2$/s$^3$ at 0.01 Hz.

8. A force feedback method as in claim 6, wherein the mass is less than 50 grams.

9. A seismometer as in claim 1, wherein the control circuit comprises an amplifier capable of producing an output voltage greater than 60 V.

10. A seismometer as in claim 1, wherein the frame, mass, suspension means, sensing transducer, control circuit, and forcing transducer together comprise a seismometer axis having a direction of sensitivity, and wherein the seismometer comprises three seismometer axes oriented so that their directions of sensitivity are perpendicular to each other.

11. A seismometer as in claim 10, wherein the directions of sensitivity of the three seismometer axes are all at equal angles from vertical when the seismometer is in a level orientation.

12. A seismometer as in claim 10, wherein the direction of sensitivity of one seismometer axis is substantially vertical and the directions of sensitivity of the other two seismometer axes are substantially horizontal when the seismometer is in a level orientation.

13. A seismometer as in claim 11, wherein the self-noise component of the forcing transducer input signal, when processed by the forcing transducer, produces variable acceleration of the mass with spectral density less than −160 dB with respect to 1 m$^2$/s$^3$ at 0.01 Hz.

* * * * *

UNITED STATES PATENT AND TRADEMARK OFFICE
CERTIFICATE OF CORRECTION

| | | |
|---|---|---|
| PATENT NO. | : 8,159,904 B2 | |
| APPLICATION NO. | : 12/709443 | |
| DATED | : April 17, 2012 | |
| INVENTOR(S) | : Geoffrey Stewart Bainbridge et al. | |

It is certified that error appears in the above-identified patent and that said Letters Patent is hereby corrected as shown below:

In the Specification:

At column 5, line numbers 6-9, please replace the entire paragraph with the following:

-- where g is the magnitude of gravitational acceleration, $\varphi$ is the boom angle 23, and the other forces and accelerations are the components of the forces and accelerations in Equation 1 in the direction of sensitivity 15. --

At column 5, lines 10-18, please replace the entire paragraph with the following:

-- Therefore, the feedback force $F_f$ 26 has components $-mg\cos\varphi - F_s$ 17, 21, which remain substantially constant for hours or days at a time, and a more rapidly time-varying component ma which is a proportional measure of seismic ground motion. The integrator cancels the constant components of force $mg\cos\varphi + F_s$ 17, 21, so that only the time-varying seismic signal appears in the seismometer output 31. The magnitudes of these constant components of force are as follows:

1. The boom angle $\varphi$ 23 varies according to the orientation of the seismometer. In field use conditions it may be significantly non-level, since precise leveling requires effort, and may not be possible in some situations. A typical installation using a bubble level will set the seismometer within 0.1 degree of level, and so $\varphi$ 23 will be within 0.1 degree of a prescribed value 22. However, the seismometer may become tilted over time by 1 degree or more due to settling or frost heaving of the soil. Furthermore, when the seismometer is deployed in a location that is not accessible by a human, for example in a

[CONTINUED ON PAGE 2]

Signed and Sealed this
Ninth Day of October, 2012

David J. Kappos
*Director of the United States Patent and Trademark Office*

CERTIFICATE OF CORRECTION (continued)
U.S. Pat. No. 8,159,904 B2

Column 5, lines 19-40 (cont'd)

borehole or on the ocean bottom, then it will likely be tilted by at least 1 degree. The effect of tilt 10 (change in $\varphi$ 23) depends on the initial value of $\varphi$ 23. A horizontal axis is most sensitive to tilt, since for $\varphi \cong 90°$, $\cos\varphi \cong \varphi$ 23, and a 1 degree tilt will cause ap 1.7% change in the gravitational force $mg\cos\varphi$ 17. A vertically oriented axis is least sensitive to tilt, since for $\varphi \cong 0$, $\cos\varphi \cong 1 - \varphi^2/2$, and a 1 degree tilt will cause only a 0.015% change in the gravitational force $mg\cos\varphi$ 17. An inclined axis in a symmetric triaxial seismometer typically has $\varphi \cong 55°$ and therefore has an intermediate sensitivity to tilt. --